(12) United States Patent
Scheibenreif et al.

(10) Patent No.: US 6,974,260 B2
(45) Date of Patent: Dec. 13, 2005

(54) FLEXIBLE SUBSTRATE FOR ROUTING FIBERS IN AN OPTICAL TRANSCEIVER

(75) Inventors: Joseph Scheibenreif, Oswego, IL (US); Bryan Noble, Oswego, IL (US); John Dallesasse, Geneva, IL (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 10/898,086

(22) Filed: Jul. 23, 2004

(65) Prior Publication Data

US 2005/0036746 A1    Feb. 17, 2005

Related U.S. Application Data

(60) Provisional application No. 60/491,188, filed on Jul. 30, 2003.

(51) Int. Cl.[7] ................................................. G02B 6/38
(52) U.S. Cl. ............................. 385/55; 385/14; 385/15
(58) Field of Search ............................... 385/55, 3, 1, 4, 385/14, 15, 39, 92

(56) References Cited

U.S. PATENT DOCUMENTS

| | | | |
|---|---|---|---|
| 6,845,184 B1 * | 1/2005 | Yoshimura et al. | 385/14 |
| 2002/0003206 A1 * | 1/2002 | Culver | 250/221 |
| 2002/0015563 A1 * | 2/2002 | Murakami et al. | 385/53 |
| 2002/0183592 A1 * | 12/2002 | Suzuki et al. | 600/145 |

\* cited by examiner

Primary Examiner—Kaveh Kianni
(74) Attorney, Agent, or Firm—Welsh & Katz, Ltd.

(57) ABSTRACT

An optical transceiver for converting and coupling an information-containing electrical signal with an optical fiber including a housing, an electro-optical subassembly in the housing for converting between an information-containing electrical signal and a modulated optical signal corresponding to the electrical signal from which at least two optical fibers extends; and a flexible substrate for securing each of the optical fibers to prevent tangling in the housing interior and to enable said fibers to bend from a first orientation to a second orientation. An optical fiber receptacle or connector is provided on the housing to couple to an external optical fiber.

11 Claims, 2 Drawing Sheets

US 6,974,260 B2

FLEXIBLE SUBSTRATE FOR ROUTING FIBERS IN AN OPTICAL TRANSCEIVER

REFERENCE TO RELATED APPLICATIONS

This application is related to U.S. patent application Ser. No. 60/491,188 filed Jul. 30, 2003, assigned to the common assignee.

BACKGROUND OF THE INVENTION

1. Field of the Invention

The invention relates to optical transceivers, and in particular to coupling assemblies or modules that provide a communications interface between a computer or communications unit having an electrical input/output connector or interface and an optical fiber, such as used in fiber optic communications links.

2. Description of the Related Art

A variety of optical transceivers are known in the art which include an optical transmit portion that converts an electrical signal into a modulated light beam that is coupled to an optical fiber, and a receive portion that receives an optical signal from an optical fiber and converts it into an electrical signal. In a high-speed unit, optical transmitter subassemblies include several lasers operating at different wavelengths and modulated with respective electrical signals for emitting a plurality of laser light beams. There beams are coupled into a plurality of optical fibers, which converge in an optical multiplexer for receiving the beams and multiplexing the respective optical signals into a single multi-wavelength beam that is coupled to a fiber optic connector for transmitting the optical signal to an external optical fiber.

SUMMARY OF THE INVENTION

1. Objects of the Invention

It is an object of the present to provide an improved optical transceiver using a flexible substrate to route and secure optical fibers from a transmitter subassembly.

It is also an object of the present to provide an improved optical transceiver using a flexible substrate to route and secure optical fibers from a subassembly.

It is another object of the present invention to provide a fused biconic tapered (FBT) coupler or similar multiplexing device mounted on a flexible substrate for use in a multi-laser optical transmission subassembly.

It is still another object of the present invention to provide an optical transceiver for use in an optical transmission system with an industry standard XENPAK housing and including a flexible substrate therein for routing optical fibers.

2. Features of the Invention

Briefly, and in general terms, the invention provides an optical transceiver for converting and coupling an information-containing electrical signal with an optical fiber, including a housing and electro-optical subassembly in the housing for converting between an information-containing electrical signal and a modulated optical signal corresponding to the electrical signal from which at least two optical fibers extend; and a flexible substrate for securing each of said optical fibers to prevent tangling or breakage during manufacturing and assembly and to enable said fibers to bend from a first orientation to a second orientation.

In another aspect of the invention, there is provided an optical transceiver including an optical multiplexer mounted on a flexible substrate for receiving at least first and second optical fibers and multiplexing the respective optical signals on the optical fibers into a single multi-wavelength beam in a single third optical fiber.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

BRIEF DESCRIPTION OF THE DRAWINGS

These and other features and advantages of this invention will be better understood and more fully appreciated by reference to the following detailed description when considered in conjunction with the accompanying drawings, wherein.

DESCRIPTION OF THE PREFERRED EMBODIMENT

Figure 1:
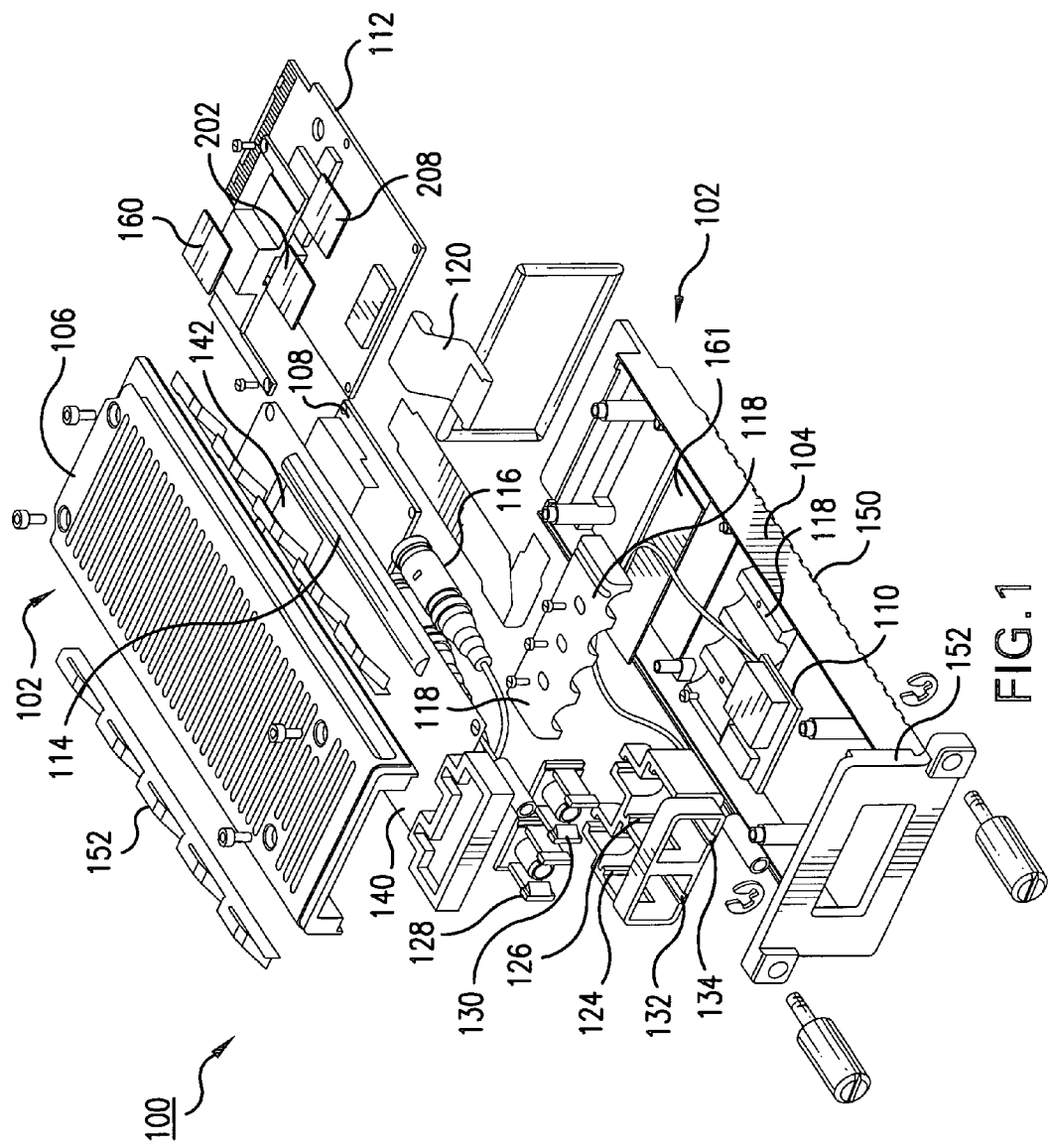
FIG. 1 is an exploded perspective view of an optical transceiver in an exemplary embodiment in accordance with aspects of the present invention.

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments or the relative dimensions of the depicted elements, and are not drawn to scale.

Referring more particularly to FIG. 1, there is provided an optical transceiver 100 for operating over both multimode (MM) and single mode (SM) fiber using multiple laser light sources, multiple photodetectors, and an optical multiplexing and demultiplexing system. This enables a single transceiver module to communicate over multiple protocols and at maximum distance goals. The transceiver 100 and its housing 102 are designed such that maximum operating efficiency is achieved cost effectively and at reduced electromagnetic interference (EMI) and thermal levels in an industry standard form factor or package design.

Advantageously, the transceiver 100 is manufactured in a modular manner preferably using three separately mounted circuit boards mounted in the housing—a transmitter subassembly, a receiver subassembly, and a protocol processing board, with each board having dedicated functions and electrically connected to each other using either flex circuitry, mating multipin connectors, land grid arrays, or other electrical interconnect devices. This enables the basic transceiver module to be configured to different protocols and to support different optoelectronic devices using a simple subassembly configuration change, thus minimizing manufacturing costs and eliminating the need for manufacturing different transceivers for each different application. In addition, the use of flex circuitry or detachable connectors to interconnect the boards allows for a modular interchangeable board design (e.g., receiver, transmitter and PCS functionality each on separate boards). Although the preferred design uses three boards, any two of the functions may be combined on a single board for an even more compact design.

The modularity of the board design also enables the placement of heat-sensitive components in the optimal location with respect to the heat-generating components (lasers and ICs) within the module housing 102. It also makes it convenient and realistic to test and troubleshoot separate modular subassemblies independently before final assembly. In addition, the flex or other interconnects allow for manufacturing of the various boards (RX, TX, PCS) to proceed in parallel instead of in serial, hence reducing the manufacturing time for the entire unit.

Figure 2:
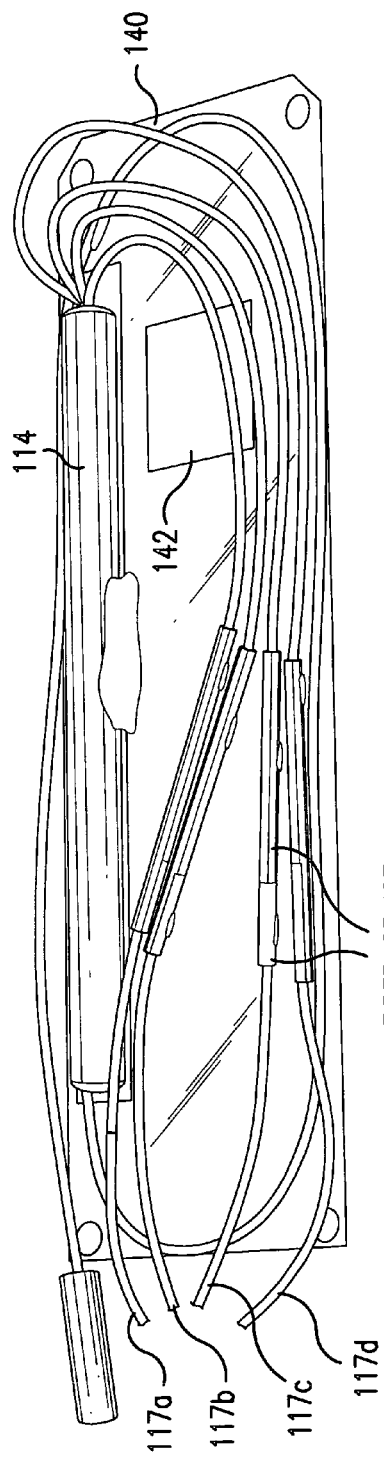
FIG. 2 is a top view of the flexible substrate for securing the optical fibers.
Figure 3:
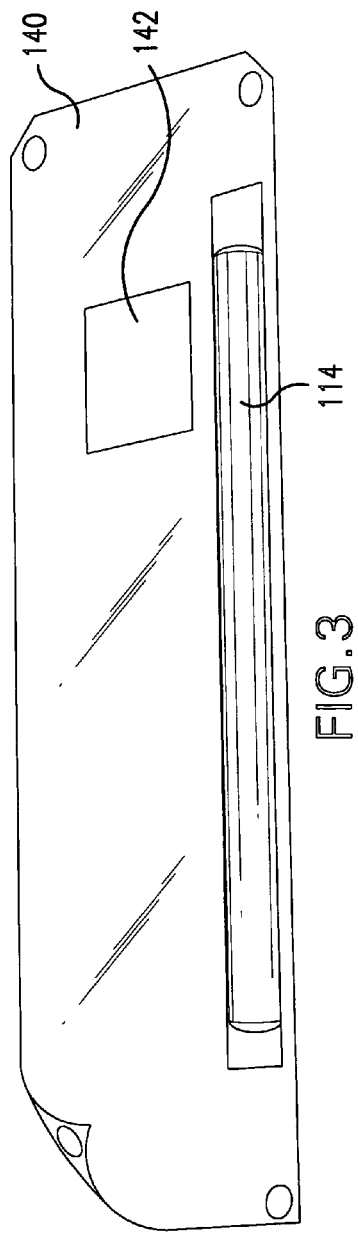
FIG. 3 is a rear view of the flexible substrate of FIG. 2.

Referring now to FIGS. 1, 2, and 3, an exemplary optical transceiver module 100 is shown according to a preferred embodiment of the present invention. In this particular embodiment, the module 100 is compliant with the IEEE 802.3ae 10GBASE-LX4 Physical Media Dependent sublayer (PMD) standard and the XENPAK™ form factor. It is to be noted, however, that the transceiver module 100 may be configured to operate under various other compliant protocols (such a Fibre Channel or SONET) and be manufactured in various alternate form factors such as X2. The module 100 is preferably a 10 Gigabit Coarse Wavelength Division Multiplexed (CWDM) transceiver having four 3.125 Gbps distributed feedback lasers and provides 300 meter transmission over legacy installed multimode fiber and from 10 to 40 km over standard single mode fiber.

The transceiver module 100 includes a two-piece housing 102 with a base 104 and a cover 106. In addition, contact strips 152 are provided to ground the module to chassis ground as well. The housing 102 is constructed of die-cast or milled metal, preferably die-cast zinc, although other materials also may be used, such as specialty plastics and the like. Preferably, the particular material used in the housing construction assists in reducing EMI. Further EMI reduction may be achieved by using castellations (not shown) formed along the edges of the housing 102.

The front end of the housing 102 includes a faceplate 152 for securing a pair of receptacles 124, 126. The receptacles 124, 126 are configured to receive fiber optic connector plugs 128, 130. In the preferred embodiment, the connector receptacles 128, 130 are configured to receive industry standard SC duplex connectors (not shown). As such, keying channels 132 and 134 are provided to ensure that the SC connectors are inserted in their correct orientation. Further, as shown in the exemplary embodiment and discussed further herein, the connector receptacle 130 receives an SC transmitting connector and the connector plug 128 receives an SC receiver connector.

In particular, the housing 102 holds three circuit boards, including a transmit board 108, a receive board 110 and a physical coding sublayer (PCS)/physical medium attachment (PMA) board 112, which is used to provide an electrical interface to external electrical systems (not shown). An optical multiplexer (MUX) 114 interfaces to the transmit board 108 via an assembly of four distributed feedback (DFB) lasers 116 in TO-cans. The lasers 116 are secured in place at the bottom of the housing 104 using a laser brace 118. The laser brace 118 also functions as a heat sink for cooling the lasers 116. In addition, the transmit board 108 and receive board 110 are connected to the PCS/PMA board 112 by respective flex interconnect 120, or other board-to-board connectors. Thermally conductive gap pads 160 and 161 are provided to transmit the heat generated by the lasers or other components to the base 104 or cover 106 of the housing, which acts as a heat sink. The receiver subassembly 110 is directly mounted on the housing base 104 using a thermally conductive adhesive to achieve heat dissipation. Different subassemblies therefore dissipate heat to different portions of the housing for more uniform heat dissipation. As illustrated in FIGS. 1 and 2, the output of the four lasers 116 is then input into the optical MUX 114. The MUX 114 is mounted on a flexible substrate 140. The substrate 140 may be an optical flexible planar material, such as FlexPlane™ available from Molex, Inc. of Lisle, Ill., although other flexible substrate may be used as well. As shown, the optical fibers 117a, 117b, 117c, 117d originating from the laser assembly 116 and being input into the MUX 114 are mounted to the substrate 140. The output of the MUX 114, which is routed to the transmit connector plug 130, is also attached to the substrate 140. The fibers 117a, 117b, 117c, 117d are routed and attached in such a manner as to minimize sharp bends in the optical fibers to avoid optical loss and mechanical failure.

The substrate 140 includes an opening 142 or hole in a portion of the material that is located directly above the retimer IC or other heat generating components mounted on the PCS/PMA board 112. The opening 142, which is substantially an area the size of the unused portion of the substrate 140, enables the heat sink on the cover to contact a heat transmission gap pad 160, so as to provide access to the mounted components on the board. This area normally would be inaccessible if not for the opening 142. For example, a heat sink may be installed in the Clock and Data Recovery components (not shown) without interfering with the routing of the optical fibers on the substrate 140 and without removing the mounted substrate 140 to allow access to the PCS/PMA board 112.

Several additional advantages are realized in using the flexible substrate 140. In particular, attaching the fibers to the substrate 140, rather than allowing the fibers to move about freely within the transceiver module housing 102, neatly maintains the routing of the optical fibers to prevent unwanted tangling and breakage during assembly of the transceiver. Furthermore, attaching the optical fibers to the substrate 140 greatly reduces the stress on the fibers, thereby reducing the incidence of microcracks forming in the fiber coatings.

The present invention implements the transceiver 100 utilizing the four standard, commercially available fiber pigtailed lasers 116 which interface to a Fused Biconic Tapered (FBT) coupler 114 to collect and multiplex laser radiation into a single fiber. Although a FBT is preferred, an arrayed waveguide grating, multimode interference coupler, or combination of spatially fixed optical elements such a lens, optical interference filters, diffractive optical elements, dielectric or metallic mirrors, or other optical components, may be used as well. The fiber that is used in the fiber pigtailed lasers 116 and the FBT 114 is affixed to the flexible substrate material 140. This prevents fiber tangling and breakage while remaining flexible and therefore easy to work with. The flexible substrate material 140 may be an optical flexible planar material, such as FlexPlane™ available from Molex, Inc, of Lisle, Ill., or Kapton™ available from E.I. Dupont de Nemours and Company of Wilmington Del. Other flexible substrates may be used as well. A conforming coating is used over the entire flex 140 is used to secure the fibers to the flex 140.

As previously noted above, several additional advantages are realized when using the flexible substrates 140 rather than allowing the fibers to move about freely within the transceiver module housing 102. Furthermore, attaching the optical fibers to the substrate 140 greatly reduces the stress on the fibers, thereby reducing the incidence of microcracks forming in the fibers. The fibers are routed and attached in such a manner as to minimize sharp bends.

It will be understood that each of the elements described above, or two or more together, also may find a useful application in other types of constructions differing from the types described above.

While the invention has been illustrated and described as embodied in a transceiver for an optical communications network, it is not intended to be limited to the details shown, since various modifications and structural cahnges may be made without departing in any way from the spirit of the present invention.

Without further analysis, the forgoing will so fully reveal the gist of the present invention that others can, by applying current knowledge, readily adapt it for various applications without omitting features that, from standpoint of prior art, fairly constitute essential characteristics of the generic or specific aspects of this invention and, therefore, such adaptions should and are intended to be comprehended within the meaning and range of equivalence of the following claims.

What is claimed is:

1. An optical transmitter for converting and coupling an information-containing electrical signal with an optical fiber comprising a housing;

an electro-optical subassembly in the housing for converting between an information-containing electrical signal and a modulated optical signal corresponding to the electrical signal from which at least two optical fibers extend wherein said optical signal is modulated at a frequency over 50 MHZ, or datarate over 50 Mbps, using an optical transmission compliant protocol;

a flexible substrate for securing each of said optical fibers to prevent tangling and to enable said fiber to bend from a first orientation to a second orientation.

2. An optical transmitter as defined in claim 1, further comprising an optical multiplexer mounted on said flexible substrate for receiving said first and second optical fibers and multiplexing the respective optical signals on said optical fiber into a single multi-wavelength beam onto a signal third optical fiber.

3. A transmitter as defined in claim 2, wherein said optical multiplexer is a fused biconic tapered coupler.

4. An transmitter as defined in claim 1, wherein said electro-optical subassembly includes first and second lasers operating at different wavelengths and modulated with respective first and second electrical signals for emitting first .and second laser light beams coupled to said first and second optical fiber respectively.

5. An optical transceiver for converting an coupling an information-containing electrical signal with an optical fiber comprising a fiber optic connector in the housing that accepts an external optical fiber for transmitting and/or receiving an optical communication signal;

an electro-optical subassembly disposed in the housing and including a plurality of lasers for converting between an information containing electrical signal and a modulated optical signal corresponding to the electrical signal from which at least two optical fibers extend in a first direction wherein said optical signal is modulated at a frequency over 50 MHZ, or datarate over 50 Mbps, using an optical transmission compliant protocol; and a flexible substrate for securing each of said optical fibers to prevent tangling and enable said fiber to bend from said first direction to a second opposite direction.

6. A transceiver as defined in claim 5, wherein said flexible substrate secures a third optical fiber and enables it to bend from said second direction to said first direction.

7. A transceiver as defined in claim 6, wherein said third optical fiber is coupled with said fiber optic connector as said third fiber extends along said first direction.

8. A transceiver as defined in claim 5, wherein said substrate is composed of a Kapton™ film.

9. A transceiver as defined in claim 5, wherein said optical fibers are secured to said substrate by conforming coating on said substrate.

10. A transceiver as defined in claim 5, further comprising an optical element mounted on said substrate and coupling at least two of said fibers.

11. A transceiver as defined in claim 10, wherein said optical element is one of a FBT, an arrayed waveguide grating, an array of dielectric mirrors, or an optical multimode interference coupler.

* * * * *